United States Patent
Murarka et al.

(10) Patent No.: US 10,338,773 B2
(45) Date of Patent: *Jul. 2, 2019

(54) SYSTEMS AND METHODS FOR DISPLAYING A DIGEST OF MESSAGES OR NOTIFICATIONS WITHOUT LAUNCHING APPLICATIONS ASSOCIATED WITH THE MESSAGES OR NOTIFICATIONS

(71) Applicant: Facebook, Inc., Menlo Park, CA (US)

(72) Inventors: Neel Ishwar Murarka, Menlo Park, CA (US); Philip Fung, San Francisco, CA (US); Niv Seker, San Francisco, CA (US); Francis Luu, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 522 days.

This patent is subject to a terminal disclaimer.

(21) Appl. No.: 14/939,148

(22) Filed: Nov. 12, 2015

(65) Prior Publication Data

US 2016/0062578 A1     Mar. 3, 2016

Related U.S. Application Data

(63) Continuation of application No. 13/842,596, filed on Mar. 15, 2013, now Pat. No. 9,225,677.

(51) Int. Cl.
| | |
|---|---|
| *G06F 3/0482* | (2013.01) |
| *H04L 12/58* | (2006.01) |
| *G06F 3/0488* | (2013.01) |
| *H04W 88/02* | (2009.01) |

(52) U.S. Cl.
CPC .......... *G06F 3/0482* (2013.01); *G06F 3/0488* (2013.01); *H04L 51/32* (2013.01); *H04L 51/36* (2013.01); *H04W 88/02* (2013.01)

(58) Field of Classification Search
CPC ..................................................... G06F 3/0482
USPC .......................................................... 715/752
See application file for complete search history.

(56) References Cited

U.S. PATENT DOCUMENTS

| | | | | |
|---|---|---|---|---|
| 5,805,825 | A * | 9/1998 | Danneels | H04H 60/06 709/217 |
| 8,136,053 | B1 * | 3/2012 | Miller | G06F 3/04883 715/863 |
| 8,583,097 | B2 * | 11/2013 | Colbert | H04L 12/1822 340/5.85 |
| 8,811,948 | B2 * | 8/2014 | Bandyopadhyay | G06F 1/1643 455/411 |

(Continued)

OTHER PUBLICATIONS

Apple, "Iphone User Guide", iPhone iOS 4.2, released on Mar. 2011, 274 pages. (Year: 2011).*

*Primary Examiner* — Reza Nabi
(74) *Attorney, Agent, or Firm* — Baker Botts L.L.P.

(57) ABSTRACT

In one embodiment, one or more communications are received by a computing device, where each communication is associated with an application on the computing device. Based on the received communications, a set of interactive elements are determined, each interactive element corresponding to a particular received communication. A subset of the interactive elements are determined based on the application associated with the communication corresponding to the interactive element, or the age of the communication corresponding to the interactive element. The subset of interactive elements is displayed.

14 Claims, 7 Drawing Sheets

(56) References Cited

U.S. PATENT DOCUMENTS

| | | | |
|---|---|---|---|
| 8,914,875 B2* | 12/2014 | Matus | G06F 21/32 726/17 |
| 9,225,677 B2* | 12/2015 | Murarka | H04L 51/32 |
| 9,311,083 B1* | 4/2016 | Milligan | G06F 9/451 |
| 2006/0026521 A1* | 2/2006 | Hotelling | G06F 3/0418 715/702 |
| 2007/0150842 A1* | 6/2007 | Chaudhri | G06F 3/04883 715/863 |
| 2008/0220752 A1* | 9/2008 | Forstall | H04M 1/56 455/415 |
| 2010/0060586 A1* | 3/2010 | Pisula | G06F 3/04886 345/169 |
| 2010/0099394 A1* | 4/2010 | Hainzl | G06F 1/32 455/418 |
| 2010/0146384 A1* | 6/2010 | Peev | H04M 1/673 715/255 |
| 2010/0146437 A1* | 6/2010 | Woodcock | G06Q 30/06 715/806 |
| 2010/0153404 A1* | 6/2010 | Ghosh | G06Q 30/02 707/748 |
| 2010/0159995 A1* | 6/2010 | Stallings | G06F 3/0488 455/566 |
| 2010/0248689 A1* | 9/2010 | Teng | H04M 1/67 455/411 |
| 2010/0306705 A1* | 12/2010 | Nilsson | G06F 3/0488 715/835 |
| 2011/0035503 A1* | 2/2011 | Zaid | H04L 63/0407 709/228 |
| 2011/0047368 A1* | 2/2011 | Sundaramurthy | G06F 3/0481 713/100 |
| 2011/0081889 A1* | 4/2011 | Gao | G06F 3/038 455/411 |
| 2011/0088086 A1* | 4/2011 | Swink | G06F 3/04883 726/7 |
| 2011/0159844 A1* | 6/2011 | Gillet | H04M 1/673 455/411 |
| 2012/0246739 A1* | 9/2012 | Mebed | G06F 21/00 726/28 |
| 2012/0331548 A1* | 12/2012 | Tseng | H04M 1/67 726/19 |
| 2013/0007665 A1* | 1/2013 | Chaudhri | H04L 51/24 715/830 |
| 2013/0246448 A1* | 9/2013 | Sa | G06F 16/954 707/758 |
| 2013/0332485 A1* | 12/2013 | Ennis | G06Q 10/10 707/770 |
| 2013/0345981 A1* | 12/2013 | van Os | G01C 21/3626 701/540 |
| 2014/0047020 A1* | 2/2014 | Matus | H04L 67/306 709/204 |
| 2014/0157379 A1* | 6/2014 | Murarka | G06F 21/31 726/7 |
| 2014/0189531 A1* | 7/2014 | Murarka | G06Q 10/00 715/753 |
| 2014/0223542 A1* | 8/2014 | Hicks | G06F 21/45 726/16 |
| 2014/0229862 A1* | 8/2014 | St. Clair | H04L 51/32 715/753 |
| 2014/0249926 A1* | 9/2014 | Wallace | G06Q 30/0277 705/14.64 |
| 2014/0258883 A1* | 9/2014 | Duarte | G06Q 10/10 715/752 |
| 2014/0282084 A1* | 9/2014 | Murarka | H04L 51/32 715/752 |
| 2015/0070283 A1* | 3/2015 | Irwin | G06F 3/0416 345/173 |

* cited by examiner

SYSTEMS AND METHODS FOR DISPLAYING A DIGEST OF MESSAGES OR NOTIFICATIONS WITHOUT LAUNCHING APPLICATIONS ASSOCIATED WITH THE MESSAGES OR NOTIFICATIONS

PRIORITY

This application is a continuation under 35 U.S.C. § 120 of U.S. patent application Ser. No. 13/842,596, filed 15 Mar. 2013, which is incorporated herein by reference.

TECHNICAL FIELD

This disclosure generally relates to displaying a digest of messages or notifications on a computing system, including displaying the digest on a mobile computing and/or communication system having an electronic visual display, such as a touchscreen, and more particularly to displaying a digest of messages or notifications without launching applications associated with the messages or notifications.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is related to a method including providing for display a digest of messages and notifications without launching applications associated with the messages or notifications, the digest comprising one or more interactive elements that each correspond to a message or notification, receiving a first user input selecting one of the interactive elements, providing for display the message or notification corresponding to the selected interactive element without launching the application associated with the message or notification corresponding to the selected interactive element, receiving a second user input interacting with the message or notification, and executing a messaging or notification function corresponding to the interaction without launching the application associated with the message or notification provided for display.

For example and as embodied herein, such a method may allow a computing device to receive messages or notifications from different applications and display the various messages or notifications in a digest on a computing device without launching their associated applications. As such, a user can quickly view various messages and notifications without having to launch each different application. As an example, the computing device may receive an instant message from another user of a social-networking system, an e-mail from an e-mail application, and a notification that another user "likes" the user's post on a social-networking system. In that example, the digest may display the instant message, the e-mail, and the notification without launching any of the applications associated with those messages and notifications. In an embodiment, if a user has multiple messages or notifications, the user may cycle through the messages and notifications in the digest.

In some embodiments, the computing device may receive a user input selecting one of the interactive elements corresponding to a message or notification in the digest. For example, a user may select an instant message from a social-networking system by tapping or pressing on an interactive element corresponding to the instant message in the digest. In that example, the instant message may be displayed without launching the social-networking application. In an embodiment, the computing device may display the selected messages or notifications in a carousel and a user may cycle through the notifications in the carousel. For example, the user may cycle through the messages or notifications by performing a swipe-touch gesture over a portion of a message or notification being provided for display in the carousel. In some embodiments, the carousel may display the messages or notifications one at a time. As such, the user may quickly cycle through the messages or notifications one at a time without launching the applications associated with each displayed message or notification. Furthermore, the user may interact with each individual message or notification without launching the application associated with the message or notification. For example, if the carousel is displaying a notification that another user checked in at a location related to the user, such as a location that the user is located, the user may respond to the notification in the carousel by liking the check-in without launching the associated social-networking application corresponding to the notification. As another example, a user may generate and send a response to an e-mail displayed in the carousel without launching the e-mail application. This may allow the user to quickly respond to all messages or notifications without having to launch each application to check for messages or notifications and interact with the messages or notifications.

In some embodiments, a message may include a communication to the user from another user. For example, the message may include a telephone call, an e-mail, a Short Message Service (SMS) message, or an instant message. In other embodiments, a message may include a push message from a push application or push service. For example, a user may download an ESPN® application that pushes notifications, such as a sports score for a particular team of interest to the user. As another example, a user may enroll in a push service alert from the user's financial institution that sends a push message to the user with the user's daily balance. In some embodiments, a notification may include an indication of an action by one or more other users on a social-networking system that relates to the user. In an embodiment, an action by one or more other users may include commenting on or liking a post to the social-networking system by the user, tagging the user in a photograph uploaded to the social-networking system, sending a friend request to the user, or checking-in at a location associated with the user.

The disclosed subject matter is also related to one or more computer-readable non-transitory storage media embodying software that is operable when executed to: provide for display a digest of messages and notifications without launching applications associated with the messages or notifications, the digest comprising one or more interactive elements that each correspond to a message or notification, receive a first user input selecting one of the interactive elements, provide for display the message or notification corresponding to the selected interactive element without launching the application associated with the message or notification corresponding to the interactive element that was selected, receive a second user input interacting with the message or notification, and execute a messaging or notification function corresponding to the interaction without launching the application associated with the message or notification provided for display.

The disclosed subject matter is further related to a system including one or more processors and a memory coupled to the processors. The memory includes instructions executable by the processors. The processors are operable when executing the instructions to: provide for display a digest of messages and notifications without launching applications associated with the messages or notifications, the digest comprising one or more interactive elements that each correspond to a message or notification, receive a first user input selecting one of the interactive elements, provide for display the message or notification corresponding to the selected interactive element without launching the application associated with the message or notification corresponding to the interactive element that was selected, receive a second user input interacting with the message or notification, and execute a messaging or notification function corresponding to the interaction without launching the application associated with the message or notification provided for display.

DESCRIPTION OF EXAMPLE EMBODIMENTS

Figure 1:
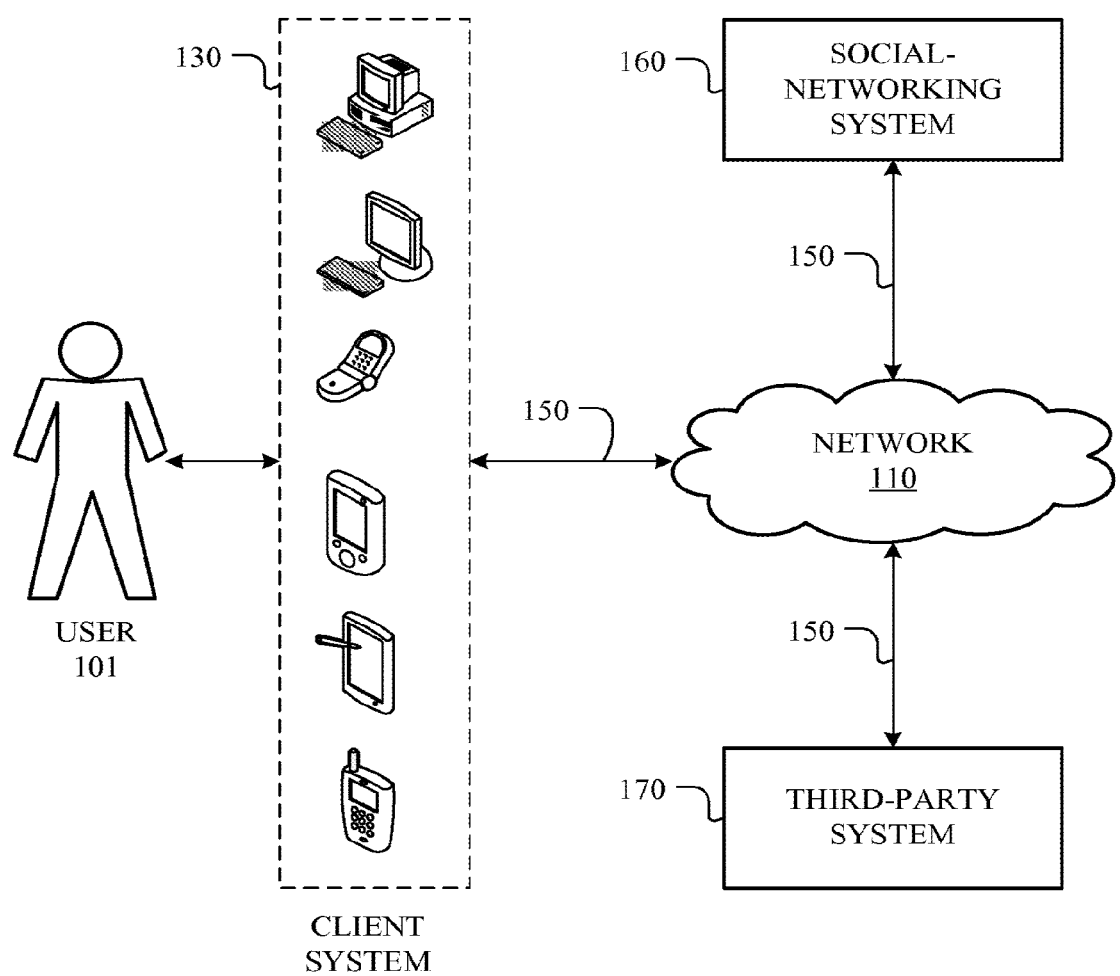
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. third-party systems 170), such as, for example, by setting appropriate privacy settings. In particular embodiments, third-party system 170 may be a network-addressable computing system that can host third-party applications. Third-party system 170 may generate, store, receive, and send third-party application data, such as, for example, data for a communication from another user of a third-party application, a game, a news update, a sports update, or any other data related to a third-party application. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
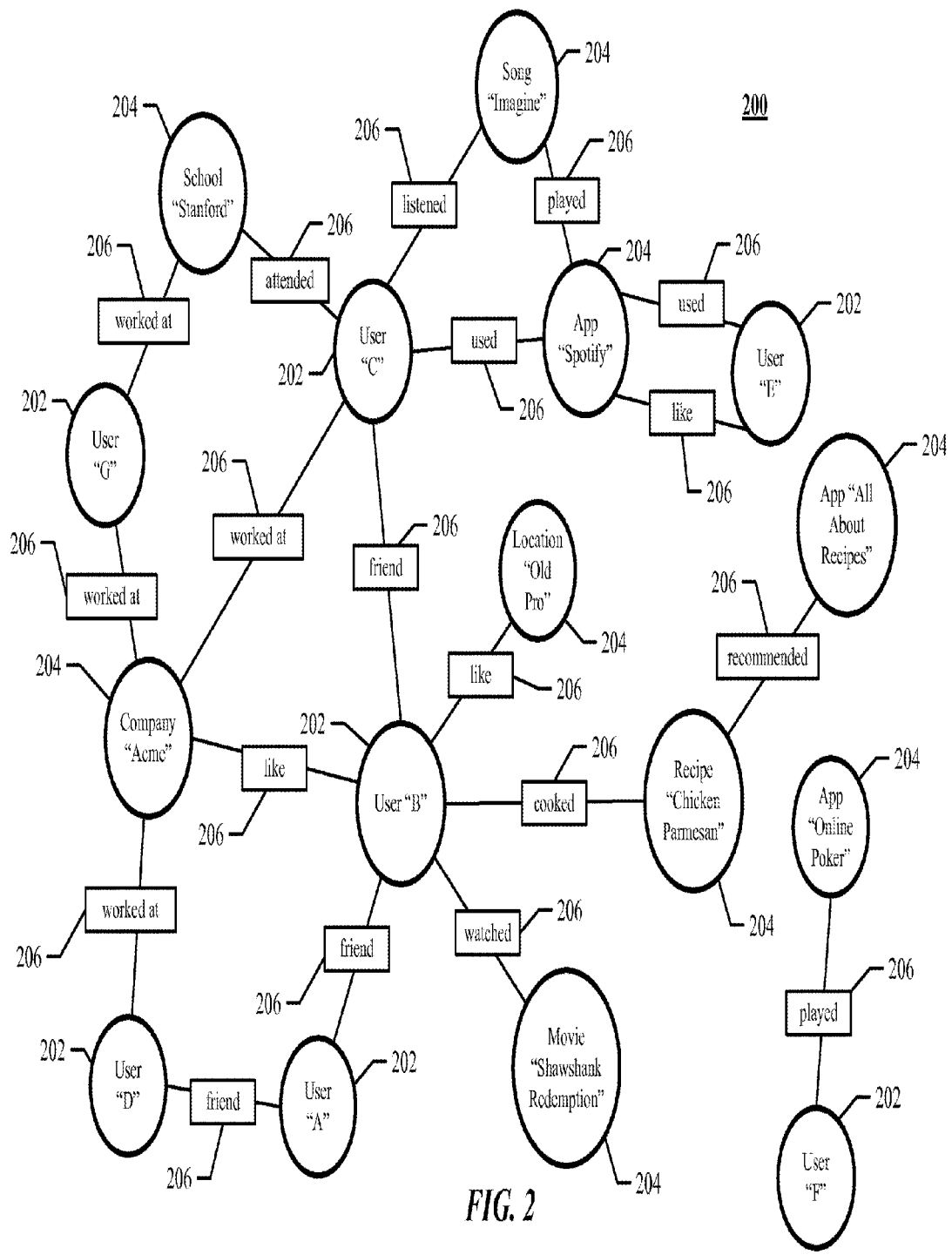
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
FIG. 3 illustrates an example scenario in which a computing device displays a digest of messages or notifications.

FIG. 3 illustrates an example scenario in which a computing device displays a digest of messages or notifications. FIG. 3 illustrates an example personal computing device 300. Personal computing device 300 may be a smartphone, a PDA, a pager, a tablet, a laptop, or any other computing and/or communication device. Personal computing device 300 may include touchscreen 310. In some embodiments, touchscreen 310 may allow a user to interact with digest 320 or interactive element 330. For example, touchscreen 310 may allow a user to tap, touch, select, swipe, hold, or press any button, icon, field, or other virtual element displayed on personal computing device 300.

In an embodiment, personal computing device 300 may display digest 320. In some embodiments, personal computing device 300 displays digest 320 while personal computing device 300 is in a locked state. For example, a user may initially "wake" the phone by clicking on any button of personal computing device 300. In that example, the device may "wake" in a locked state and display digest 320 without the user unlocking the phone. In some embodiments, one or more pre-determined portions of digest 320 of messages and notifications are provided for display when personal computing device 300 is in a locked state. For example, the pre-determined portions of digest 320 may include the most recently received messages or notifications. As another example, one or more pre-determined portions of digest 320 may include only messages or notifications from certain applications. In that example, the user may configure digest 320 to prioritize how the notifications appear when personal computing device 300 is in a locked state, such as by selecting the applications that are most important to the user. As yet another example, if all notifications and messages are from a single application, such as a social-networking application, the one or more pre-determined portions of digest 320 that are displayed may include only the messages or only the notifications. In other embodiments, personal computing device 300 may display digest 320 in an unlocked state. For example, the user may wake personal computing device 300 and perform a user gesture to unlock personal computing device 300. In that example, personal computing device 300 may display digest 320 until personal computing device 300 receives a user input exiting digest 320. In some embodiments, digest 320 is automatically displayed without any user interaction. For example, digest 320 may automatically display if there are new notifications when the user wakes personal computing device 300. As another example, digest 320 may automatically display while user is using personal computing device 300 in an unlocked state and new messages or notifications are received. In an embodiment, digest 320 may include summary of updates 340 to summarize the unviewed messages or notifications in digest 320. For example, summary of updates 340 may notify user that there are three new sports updates from a push application and two new messages from social-networking system 160. As such, the user may quickly determine the total number of messages or notifications in all of the various applications without launching any of the applications.

In an embodiment, a message may include a telephone call, an e-mail, a Short Message Service (SMS) message, an instant message (IM), a social-media message, or any other communication from another user. In another embodiment, a message may include a push message from a push application or push service. In an embodiment, a notification may include an indication of an action by one or more other users on social-networking system 160 that relates to the user. For example, an indication of an action by another user may include commenting on or liking a user's post on social-networking system 160, one or more other users tagging the user in a photograph uploaded to social-networking system 160, one or more other users sending a friend request to the user, one or more other users checking in at a location associated with the user, an offer that another user claimed or sent to the user, or any other social-media notification. In other embodiments, a notification may include various information from social-networking systems 160, such as a sports update, a news update, a video game update, an offer, or any other information from social-networking system 160.

In some embodiments, digest 320 may include interactive element(s) 330 corresponding to a message(s) or a notification(s) from various applications. In particular embodiments, interactive element(s) 330 may allow a user to interact with the messages or notifications in digest 320 without launching applications associated with the messages or notifications corresponding to interactive element(s) 330 that the user selected. For example, if digest 320 displays an interactive element 330, such as a button corresponding to an SMS message from another user, the user may tap the button to select the SMS message for display without launching the SMS application. In an embodiment, interactive element 330 may include any feature permitting the user to interact with digest 320. For example, interactive element may include a button corresponding to a message or notification from an application that may allow a user to select the message or notification. As another example, interactive element 330 may include the message or notification itself. As yet another example, interactive element 330 may include a field permitting a user to reply to a message. As still yet another example, interactive element 330 may include an icon allowing a user to "like" another user's post to social-networking system 160. As discussed above and in particular embodiments, a user may interact with interactive elements 330 in a variety of ways, such as tapping, swiping, touching, holding, or pressing touchscreen 310. As discussed below and in some embodiments, the message or notification corresponding to the selected interactive element 330 is provided for display without launching an application associated with the message or notification corresponding to the selected interactive element 330.

In some embodiments, touchscreen 310 may receive a user input to cycle through the messages or notifications in digest 320. For example, a user may perform a swipe touch-gesture over a portion of the message or notification being provided for display. In that example, the user may cycle through the messages or notifications in digest 320 by performing the swipe-touch gesture. As another example, a user may touch, tap, or press a virtual arrow displayed to cycle through the messages or notifications in digest 320.

Figure 4:
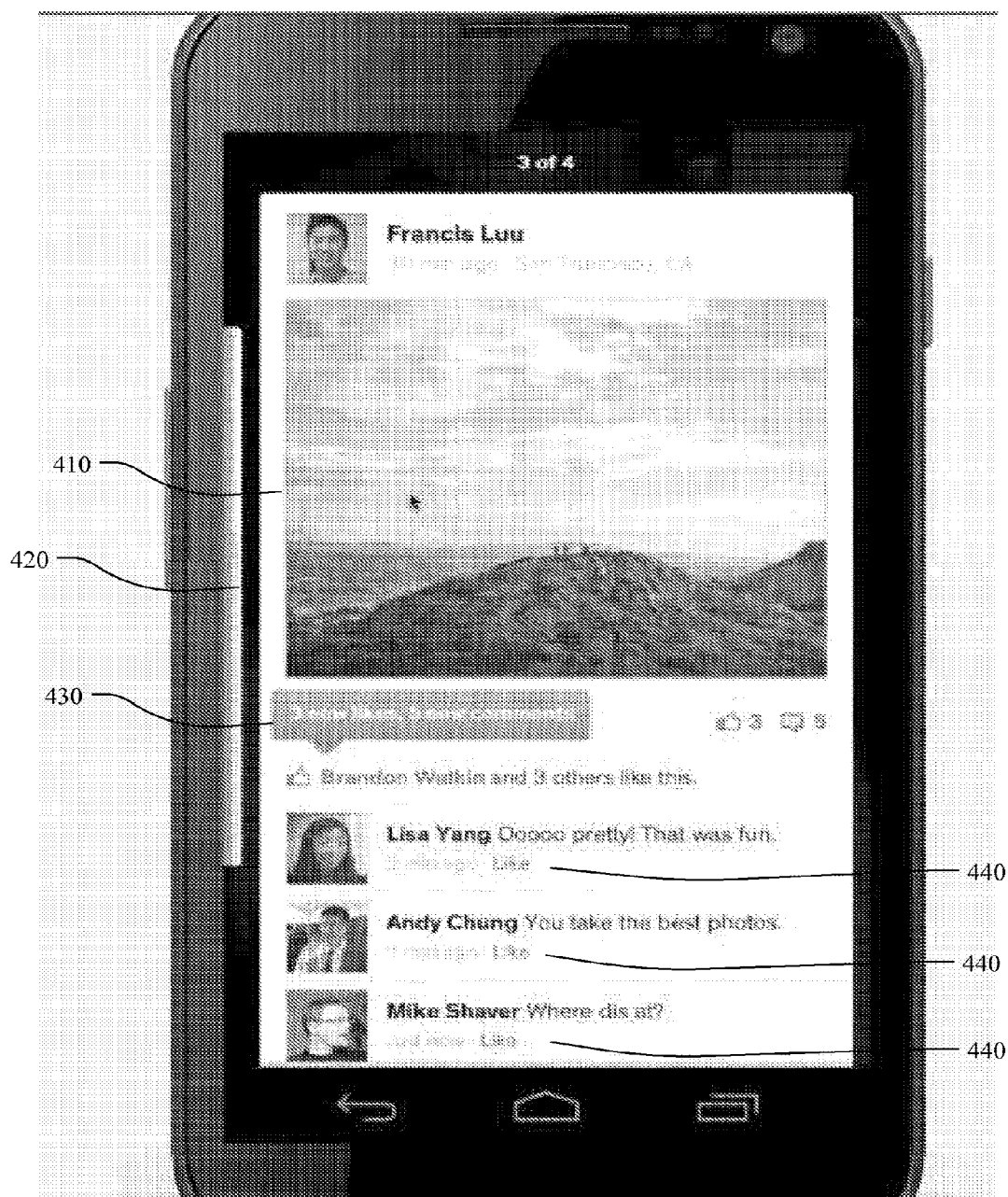
FIG. 4 illustrates an example scenario in which a computing device displays a selected message or notification.

FIG. 4 illustrates an example scenario in which a personal computing device displays a selected message or notification. In some embodiments, personal computing device 300 may receive a first user input selecting interactive element 330 corresponding to a message or notification 410 in digest 320. For example, the user may press, tap, hold, or touch a particular interactive element 330 to select interactive element 330 corresponding to a message or notification 410 in digest 320. In an embodiment, personal computing device 300 may then display message or notification 410 one at a time in carousel 420 without launching the application associated with the message or notification 410. As an example, if a user selects interactive element 330 corresponding to message 410 from digest 320, personal computing device 300 may display the selected message 410 in carousel 420 without launching the selected message's 410 associated application. As such, personal computing device 300 may display the selected message 410 in carousel 420 one at a time so that a user may interact with the message or notification without launching an application corresponding to the message or notification 410. As another example and as shown in FIG. 4, if the user selects interactive element 330 corresponding to notification 410, such as for example a photo that the user was tagged in, personal computing device 300 may display the selected notification 410 in carousel 420 without launching the application associated with the photo. As yet another example, if the user selects interactive element 330 corresponding to message 410, such as for example a push message including a sports update, personal computing device 300 may display the selected push message in carousel 420 without launching the application associated with the sports update. In another embodiment, personal computing device 300 may display the selected notification 410 in digest 320, such as by enlarging the selected notification while still displaying the other messages or notifications contained in digest 320.

In an embodiment, carousel 420 may display a portion of the additional messages and/or notifications as FIG. 4 demonstrates so that a user may cycle through the messages and/or notifications in carousel 420 one at a time without launching the applications associated with the messages and/or notifications 410. For example, a user may have two sports update push messages from separate applications and two social-networking notifications from separate social-networking applications. In that example, carousel 420 may display the message corresponding to interactive element 330, such as for example, one of the push messages containing the sports update. In that example and as shown in FIG. 4, carousel 420 may display the edge of the other push message so that the user knows there are additional messages to view. As such, carousel 420 may display the sports updates and social-networking notifications one at a time without launching their associated applications.

Some embodiments may permit a user to cycle through the message or notification 410 one at a time without launching the applications associated with the messages or notifications. For example, carousel 420 may permit a user to cycle through the two sports push messages from the two sports applications and the two social-networking notifications from the two social-networking applications without launching any of the applications. Generally, a user may cycle through the messages or notification by performing any user gesture on touchscreen 310. In an embodiment, user may cycle through the messages and/or notifications in carousel 420 by performing a swipe-touch gesture over a portion of the message or notification being provided for display. For example, a user may perform a swipe-touch gesture over a portion of the sports push message to cycle to the other sports push message or the social-netwoking notifications. In another embodiment, user may cycle through the messages and/or notifications in carousel 420 by tapping or touching virtual arrows or any other virtual icon that may be displayed on touchscreen 310. In some embodiments, carousel 420 may include summary of interactions 430. For example, summary of interactions 430 may indicate the new interactions that the displayed message or notification 410 has received.

In an embodiment, messages or notifications 410 may include various interactive features 440. For example, interactive feature 440 may include a button to comment on or "like" another user's post to social-networking system 160. As another example, interactive feature 440 may include an option to confirm a friend request, such as a "confirm" or "decline" button. As yet another example, interactive element 440 may include another user's social-networking profile picture. In that example, a user may touch, tap, or select interactive element 440 corresponding to the profile picture to view the user's profile. As still yet another example, interactive element 440 may include an option, such as an interactive icon, to check in at a particular location. As another example, interactive element 440 may include a field for text entry so that a user may generate and respond to a message or notification 410.

In an embodiment, personal computing device 300 receives a user input interacting with the message or notification 410 provided for display. In some embodiments, the user input may include tapping, touching, holding, swiping, or any other user input on touchscreen 310. For example, a user may tap interactive feature 440 corresponding to a notification 410 from social-networking system 160 to confirm a friend request without launching the social-networking application. In particular embodiments, personal computing device 300 executes a messaging or notification function corresponding to the interaction without launching the application on the computing device associated with the message or notification provided for display. In some embodiments, the interaction with the message or notification includes generating and sending a response to the message. For example, message 410 may be displayed in carousel 420 with interactive feature 440 permitting the user to tap a reply button, type a message on a virtual keyboard, and send the message without launching the application associated with the received message. In that example, once the message is sent, the user may continue to cycle through messages in digest 420 without launching any of applications associated with the various messages and/or notifications 410. In other embodiments, the interaction with the message or notification includes generating and sending a post to social-networking system 160 in connection with notification 410. For example, the user may comment on or like a photograph that the user was tagged in by another user. In that example, the user may comment on or like the photograph without launching the associated social-networking application.

Figure 5:
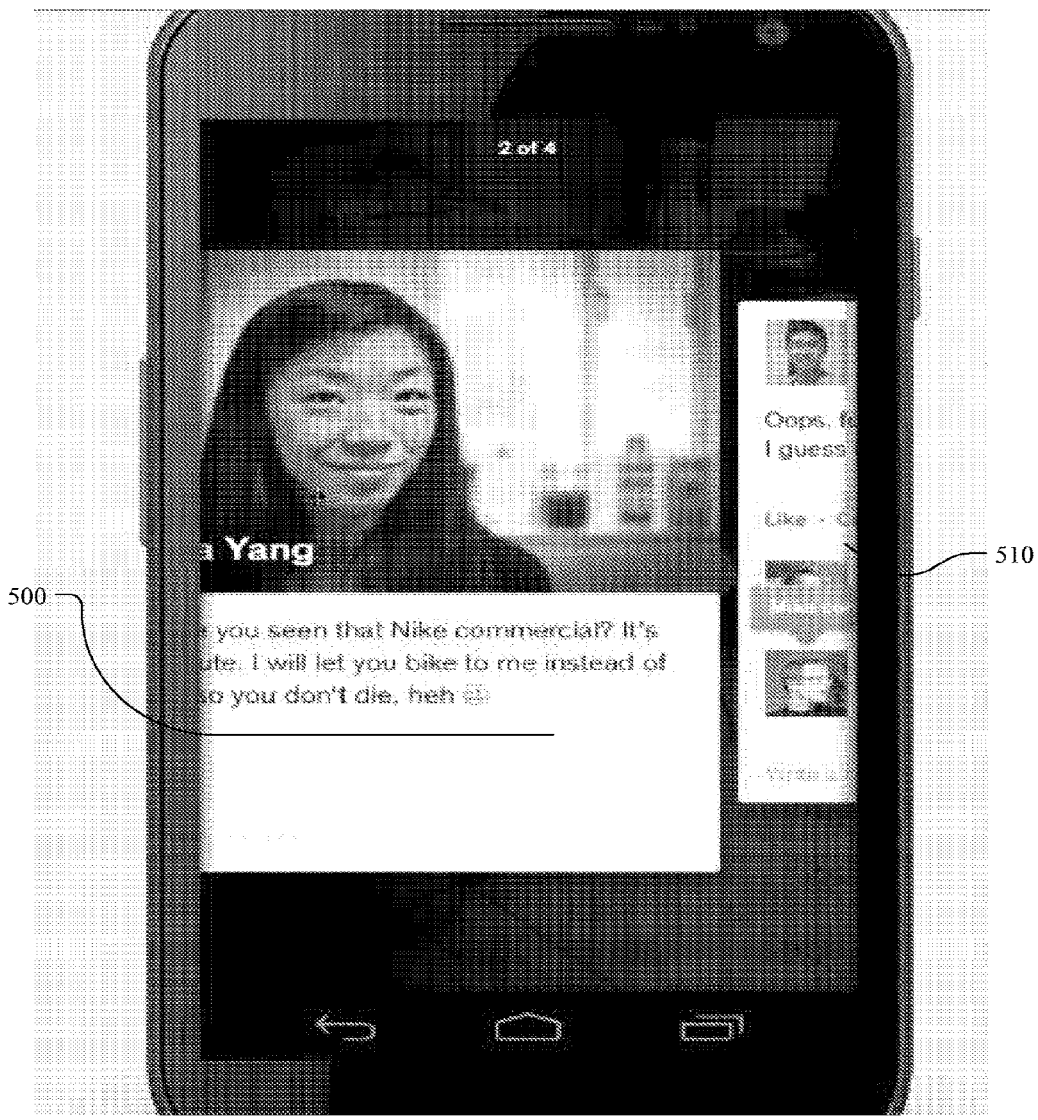
FIG. 5 illustrates an example scenario in which a computing device cycles through messages or notifications in a carousel.

FIG. 5 illustrates an example scenario in which a personal computing device cycles through messages or notifications in a carousel. As discussed above, messages and/or notifications may be displayed in carousel 510. In some embodiments, personal computing device 300 may receive a user input using touchscreen 500 to cycle through the messages and/or notifications in carousel 510. For example, a user may perform a swipe-touch gesture over a predetermined portion of the message or notification being provided for display. As shown in FIG. 5, and in particular embodiments, the messages or notifications are cycled through carousel 510 as touchscreen 500 receives a user input, such as a swipe-touch gesture. For example, a user may have multiple messages or notifications 410 from different applications, such as an instant message from a social-networking application, a push message including a news update from a news application, and a photo that the user was tagged in from a photo application. In that example, the user may cycle through the instant message, the news update, and the photo in carousel 510 without launching any of their associated applications. In some embodiments, cycling through the messages or notifications includes displaying them one at a time in carousel 510.

Figure 6:
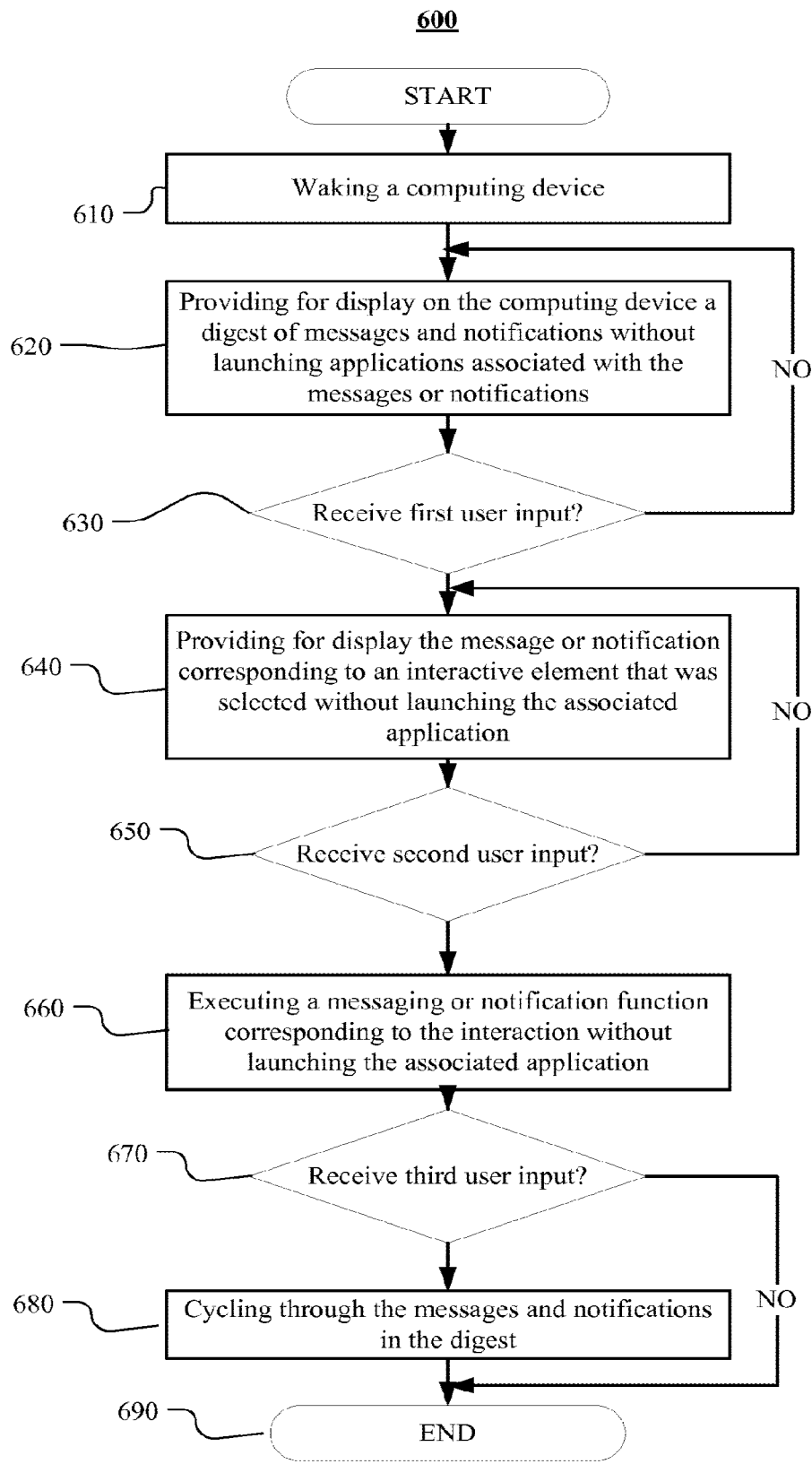
FIG. 6 illustrates an example method for displaying a digest of messages or notifications without launching applications associated with the messages or notifications.

FIG. 6 illustrates an example method for displaying a digest of messages or notifications without launching applications associated with the messages or notifications. The method may begin at step 610, where a user may wake personal computing device 300. For example, a user may wake personal computing device 300 by tapping touchscreen 310, pressing a button on personal computing device 300, or any user gesture on touchscreen 310. At step 620, digest 320 of messages or notifications is provided for display on personal computing device 300 without launching applications associated with the messages or notifications. For example, the user may have multiple messages from other users on social-networking system 160 and multiple notifications from various social-networking applications, such as another user commenting on or liking a post to social-networking system 160 by the user. In that example, personal computing device 300 may display the messages from other users as well as the comments and likes without launching any of the various applications. As another example, digest 320 may display an SMS message, a push message, and a message indicating a missed telephone call from various applications without launching each respective application. In some embodiments, one or more pre-determined portions of digest 320 of messages and notifications is provided for display while the device is in a locked state. For example, if the user wakes the device, but does not unlock it, by for example, inputting a security password or performing a user gesture on touchscreen 310 to unlock, one or more pre-determined portions of digest 320 of messages and notifications may be displayed. In that example, the predetermined portions of digest 320 of messages and notifications may include the most recently received messages or notifications.

In some embodiments, as discussed above, a message may include a communication to the user from another user. For example, a message may include a phone call, an e-mail, an SMS message, or an instant message. In an embodiment, a message may include a push message, such as an offer from a store. In some embodiments, as discussed above, a notification may include an indication of an action by one or more other users on social-networking system 160 that relates to the user. An action by one or more other users on social-networking system 160 that relates to the user may include, for example, another user commenting on or liking a post to social-networking system 160 by the user, another user tagging the user in a photograph uploaded to social-networking system 160, another user sending a friend request to the user, or another user checking-in at a location associated with the user.

At step 630, personal computing device 300 may receive a first user input. In an embodiment, personal computing device 300 may receive a first user input selecting one of the interactive elements 330 corresponding to the various messages or notifications in digest 320. For example, the user may touch, tap, hold, press, or select in any manner interactive element 330 corresponding to a message or notification. If a user input is not received, the method may return to step 620, where it may continue to display digest 320 and wait for a first user input. At step 640, personal computing device 300 displays message or notification 410 corresponding to interactive element 330 that the user selected without launching the application associated with the message or notification corresponding to interactive element 330 that the user selected. For example, if a user selects interactive element 330 corresponding to an e-mail in digest 320 that also included two instant messages, a text message, an e-mail, and a notification that another user tagged the user in a photo, personal computing device 300 may display the e-mail in digest 320. In that example, the selected e-mail may be enlarged in digest 320, and digest 320 may still display portions of the unselected messages and notifications. In some embodiments, the e-mail may be displayed in carousel 420 that displays each message or notification 410 one at a time without launching the application associated with the message or notification 410.

At step 650, personal computing device 300 receives a second user input interacting with the message or notification 410 provided for display. For example, as is described above, a second user input may include tapping, touching, pressing, swiping, holding, or any user input. If a second user input is not received, the method returns to step 640. At step 660, personal computing device 300 executes a messaging or notification function corresponding to the interaction in response to the second user input without launching the application associated with message or notification 410 provided for display. In an embodiment, a user may generate and send a response to a received message. For example, a user may generate and respond to an e-mail without launching an associated e-mail application. In that example, the user may type and send the response from digest 320 or carousel 420. As another example, a user may generate and send a response to an instant message without launching the instant messaging application. As yet another example, a user may generate and send a response to an SMS message without launching an SMS application. In an embodiment, a user may generate and send a post to a social-networking system in connection with a notification without launching the social-networking application. For example, the user may tap on an portion of a social-networking post, such as a comment field, generate a post by typing a message, and send the post to social-networking system 160.

At step 670, personal computing device 300 receives a third user input. For example, as discussed above, the third user input may include a swipe-touch gesture over a portion of the message or notification being provided for display on touchscreen 310. As another example, the third user input may include tapping, pressing, or holding virtual arrows. In an embodiment, the third user input may be received to cycle through the messages and notifications in digest 320. In another embodiment, the third user input may be received to cycle through the messages and notifications in carousel 420. If a third user input is not received, the method proceeds to step 690, where the method ends. At step 680, personal computing device 300 cycles through the messages and notifications in the digest in response to the third user input. For example, personal computing device may cycle through the messages or notifications in response to a swipe-touch gesture performed over a portion of the message or notification 410 being provided for display. As another example, personal computing device 300 may cycle through the messages or notifications 410 by displaying them one at a time in carousel 420. At step 690, the method ends.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. As an example, a user may select interactive element 330 and cycle through messages or notifications 410 in carousel 420 prior to executing a messaging or notification function. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
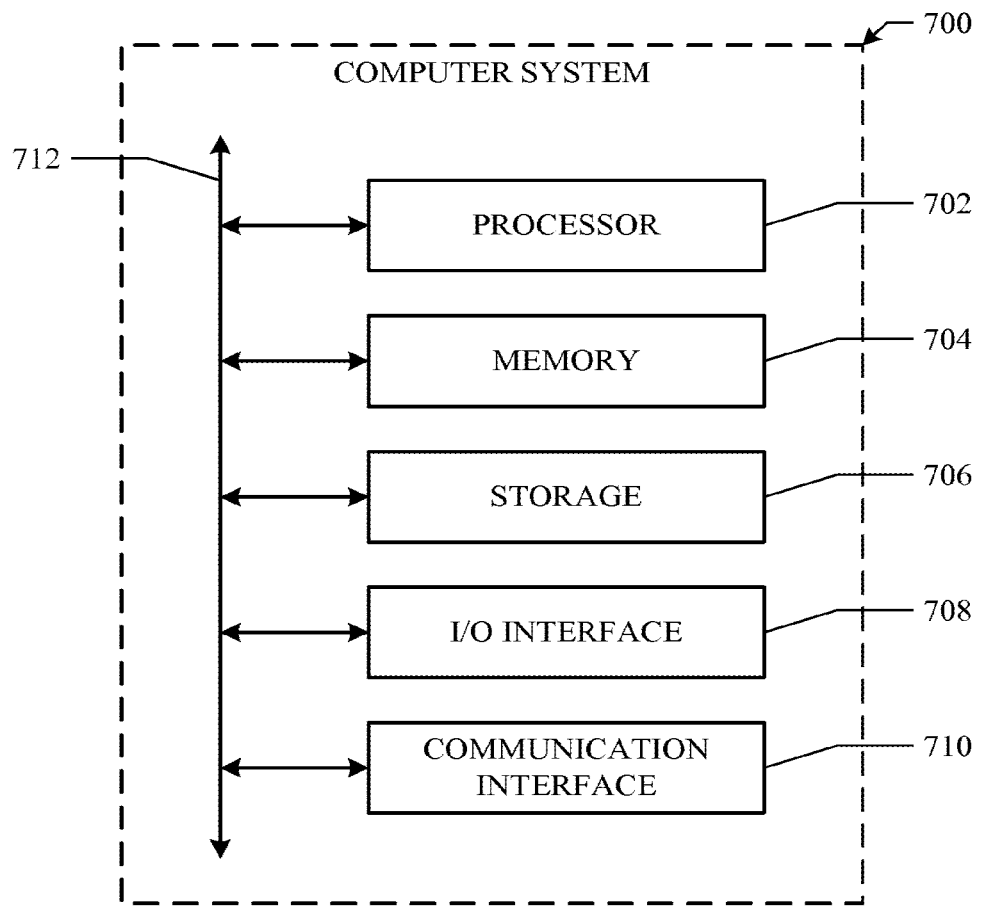
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving a plurality of notifications, wherein each notification is associated with an application on the computing device;
   by the computing device, displaying the notifications on a display screen of the computing device;
   by the computing device, receiving a user input on the display screen of the computing device to cycle through the notifications in a carousel one at a time without launching an application associated with each of the notifications on the computing device; and
   by the computing device, in response to the user input, cycling through the notifications in the carousel and displaying them one at a time while the computing device in a locked state, wherein the user input comprises a swipe-touch gesture over a portion of the notifications being provided for display, wherein the notification comprises a telephone call, e-mail, Short Message Service (SMS) message, or instant message (IM).

2. The method of claim 1, wherein the notification is associated with a social-networking system comprising a graph comprising a plurality of nodes and edges connecting the nodes, at least one node in the graph corresponding to a first user of the computing device.

3. The method of claim 2, wherein the notification comprises: one or more other users of the social-networking system commenting on or liking a post to the social-networking system by the first user;
the one or more other users tagging the first user in a photograph uploaded to the social-networking system;
the one or more other users sending a friend request to the first user; or
the one or more other users checking-in at a location associated with the first user.

4. The method of claim 1, wherein the notifications are provided for display when the computing device is in a locked state.

5. The method of claim 1, wherein the computing device is a smartphone.

6. The method of claim 1, wherein the notification comprises one or more interactive elements for performing a social-networking functionality without launching the application associated with the notification.

7. The method of claim 6, further comprising:
by the computing device, receiving a subsequent user input selecting an interactive element of the one or more interactive elements in the notification;
by the computing device, in response to the subsequent user input, providing for display on the display screen of the computing device an enlarged view of the notification in the carousel while displaying edges of one or more other notifications in the carousel, wherein the edges of the one or more other notifications indicate to the user that there are additional notifications to view.

8. One or more computer-readable non-transitory storage media embodying software that is operable when executed to:
receive a plurality of notifications, wherein each notification is associated with an application on a computing device;
display the notifications on a display screen of the computing device; receive a user input on the display screen of the computing device to cycle through the notifications in a carousel one at a time without launching an application associated with each of the notifications on the computing device; and in response to the user input, cycle through the notifications in the carousel and displaying them one at a time while the computing device in a locked state, wherein the user input comprises a swipe-touch gesture over a portion of the notifications being provided for display, wherein the notification comprises a telephone call, e-mail, Short Message Service (SMS) message, or instant message (IM).

9. The media of claim 8, wherein the notification is associated with a social-networking system comprising a graph comprising a plurality of nodes and edges connecting the nodes, at least one node in the graph corresponding to a first user of the computing device.

10. The media of claim 9, wherein the notification comprises:
one or more other users of the social-networking system commenting on or liking a post to the social-networking system by the first user;
the one or more other users tagging the first user in a photograph uploaded to the social-networking system;
the one or more other users sending a friend request to the first user; or
the one or more other users checking-in at a location associated with the first user.

11. The media of claim 8, wherein the notifications are provided for display when the computing device is in a locked state.

12. The media of claim 8, wherein the notification comprises one or more interactive elements for performing a social-networking functionality without launching the application associated with the notification.

13. The media of claim 12, wherein the software is further operable when executed to:
receive a subsequent user input selecting an interactive element of the one or more interactive elements in the notification;
in response to the subsequent user input, provide for display on the display screen of the computing device an enlarged view of the notification in the carousel while displaying edges of one or more other notifications in the carousel, wherein the edges of the one or more other notifications indicate to the user that there are additional notifications to view.

14. A system comprising: one or more processors; and
a memory coupled to the processors comprising instructions executable by the processors, the processors operable when executing the instructions to:
receive a plurality of notifications, wherein each notification is associated with an application on the system;
display the notifications on a display screen of the system; receive a user input on the display screen of the system to cycle through the notifications in a carousel one at a time without launching an application associated with each of the notifications on the computing device; and in response to the user input, cycle through the notifications in the carousel and displaying them one at a time while the computing device in a locked state, wherein the user input comprises a swipe-touch gesture over a portion of the notifications being provided for display, wherein the notification comprises a telephone call, e-mail, Short Message Service (SMS) message, or instant message (IM).

* * * * *